United States Patent
Graupner

(10) Patent No.: US 7,200,589 B1
(45) Date of Patent: Apr. 3, 2007

(54) FORMAT-INDEPENDENT ADVERTISING OF DATA CENTER RESOURCE CAPABILITIES

(75) Inventor: Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/264,587

(22) Filed: Oct. 3, 2002

(51) Int. Cl.
*G06F 17/30* (2006.01)

(52) U.S. Cl. ............................................. 707/3
(58) Field of Classification Search ........... 707/1–5, 707/10, 200, 203; 705/1
See application file for complete search history.

(56) References Cited

U.S. PATENT DOCUMENTS

| | | | |
|---|---|---|---|
| 5,151,857 A * | 9/1992 | Matsui | 704/9 |
| 6,047,299 A * | 4/2000 | Kaijima | 715/532 |
| 6,189,002 B1 * | 2/2001 | Roitblat | 707/1 |
| 6,308,163 B1 * | 10/2001 | Du et al. | 705/8 |
| 6,438,533 B1 * | 8/2002 | Spackman et al. | 706/45 |
| 6,574,655 B1 * | 6/2003 | Libert et al. | 709/200 |
| 6,772,139 B1 * | 8/2004 | Smith, III | 707/3 |
| 6,826,568 B2 * | 11/2004 | Bernstein et al. | 707/6 |

OTHER PUBLICATIONS

The Semantic Web, http://www.w3.org/2001/sw, Mar. 3, 2003.

Rolia, J., Singhai, S., Friedrich, R.: Adaptive Data Centers, Proceedings of SSGRR 2000 Computer and eBusiness Conference, L'Aquila, Italy, Proceedings on CD-ROM, ISBN 88-85280-52-8, Aug. 2000. Copy not available.

The above-referenced application incorporates by reference U.S. Appl. No. 10/243,342 entitled "Automated Advertising and Matching of Data Center Resource Capabilities" by Graupner et al. filed on Sep. 13, 2002. Copy not available.

(Continued)

*Primary Examiner*—Don Wong
*Assistant Examiner*—Marc Filipczyk
(74) *Attorney, Agent, or Firm*—Richard P. Lange

(57) ABSTRACT

A method for format-independent advertising capabilities of data centers. In various embodiments, respective capability data sets are registered to a computing arrangement for one or more data centers. Each capability data set indicates resources available at a data center. Respective format descriptions are associated with the capability data sets, wherein each format description defines a syntax in which capabilities are described in a capability data set. Respective terms descriptions of terms are associated with the capability data sets, wherein each terms description defines the semantic meaning of a terms used in a capability data set. The computing arrangement receives queries that indicate capability requirements of a data center. In response to a query, the capability data sets that match the query are provided to the requesting entity.

18 Claims, 5 Drawing Sheets

OTHER PUBLICATIONS

UDDI: Standardization Effort on Universal Description, Discovery and Integration (UDDI) of Businesses in the Web, http://www.uddi.org. Sep. 6, 2000.

Kotov, V.: On Virtual Data Centers and Their Operating Environments, HP Labs Technical Report, HPL-2001-44, Mar. 2001.

Web Services Description Langauge (WSDL), http://www.w3.org/TR/w sdl. Mar. 15, 2001.

Resource Description Framework (RDF), http://www.w3.org/RDF/. Mar. 3, 2003.

XML, Schema, http://www.w3.org./XML/Schema. Mar. 3, 2003.

W3C, The World Wide Web Consortium, http://www.w3c.org. Mar. 3, 2003.

Xpath Requirements, Version 2.0, W 3C Working Draft Feb. 14, 2001, http://www.w3.org/TR/xpath20req. Feb. 14, 2001.

XQuery 1.0 Formal Semantics W 3C Working Draft Mar. 26, 2002, http://www.w3.org/TR/2002/WD-query-semantics-20020326/. Mar. 26, 2002.

Guarino N., Formal Ontology and Information Systems. In N. Guarino (ed.), Formal Ontology in Information Systems. Proc. of the 1st International Conference, Trento, Italy, Jun. 6-8, 1998. IOS Press (amended version), http://www.ladseb.pd.cnr.it/infor/Ontology/Papers/FOIS98.pdf. Jun. 6, 1998.

Rolia, J., Singhal, S., Friedrich, R.: Adaptive Date Centers, Proceedings of SSGRR 2000 Computer and eBusiness Conference, L'Aquila, Italy, Proceedings on CD-ROM, ISBN 88-85280-52-8, Aug. 2000.

* cited by examiner

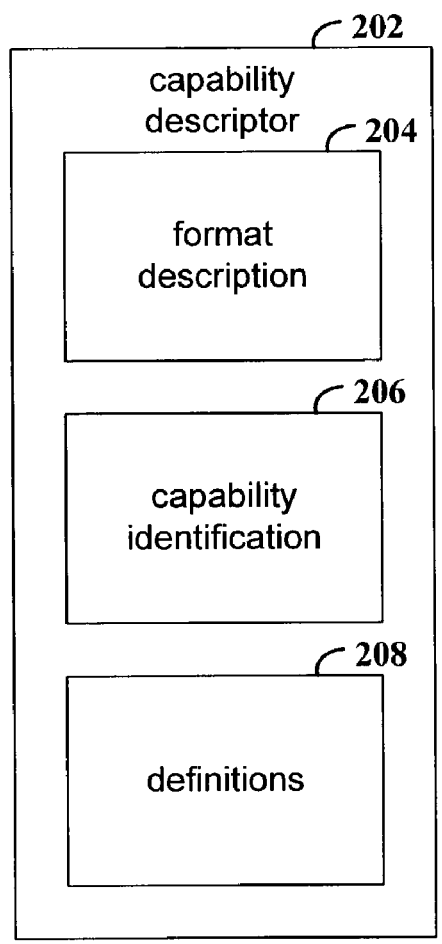
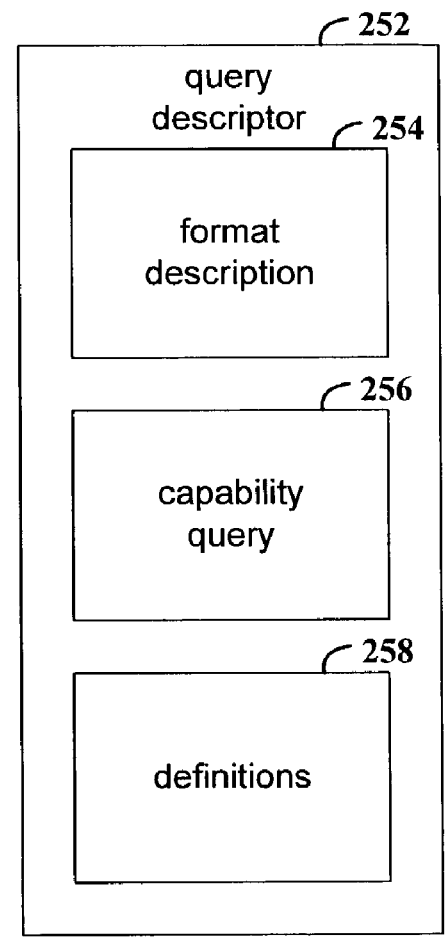
FIG. 3A                    FIG. 3B

FORMAT-INDEPENDENT ADVERTISING OF DATA CENTER RESOURCE CAPABILITIES

FIELD OF THE INVENTION

The present invention generally relates to grid computing arrangements, and more particularly to matching the needs and capabilities of data centers in a grid computing arrangement.

BACKGROUND

The grid computing model treats resources of computing systems in a manner analogous to the way in which a power grid supplies electricity. In the grid computing model, multiple data centers collectively provide resources to various users. The users are generally unaware of the identity of the particular data center providing a resource in much the same way that users of electricity are unaware of which power generators are currently contributing to the local power supply.

Situations may arise where users' demands on a data center exceed or are different from the capabilities of one data center. For example, a business user's data storage needs are likely to grow as the user's business grows. In this situation additional storage resources must be found to meet the user's needs. Rather than physically expand the resources of one data center to meet growing needs, other data centers are called upon to provide the necessary resource. A similar situation may arise in the services that are provided by data centers and the services needed by clients.

Current methods for matching resource demands with resource supplies in data centers are often managed by operators. Users of applications interact with human operators in order to request additional resources or release unneeded resources. Thus, it is left to operators to recognize and respond to changes in resource requirements and capabilities in data centers. Operators, however, in responding to resource requests may have difficulty finding optimal matches in large combinatorial allocation spaces. Furthermore, manually managing the resource allocations of data centers presents large operation costs and creates the risk of human-introduced errors. Errors in resource allocation may affect the availability of resources and entire data centers, and also result in lost revenue.

Further complicating the management of resources allocated between data centers is the exchange of information that describes the resources and requirements. Not only must steps be taken to initially establish relationships between data centers, but the exchange of information between data centers requires an agreed-upon format for the information—possibly leading to quadratic growth in information exchange formats. The manager of data center resource information must also devise a way to keep the information current so that decisions are not made based on dated and inaccurate information.

A system and method that address the aforementioned problems, as well as other related problems, are therefore desirable.

SUMMARY OF THE INVENTION

In various embodiments, the invention provides format-independent advertising of data center capabilities. Respective capability data sets are registered to a computing arrangement for one or more data centers. Each capability data set indicates resources available at a data center. Respective format descriptions are associated with the capability data sets, wherein each format description contains a syntax definition in which capabilities are described in a capability data set. In a related embodiment, respective terms descriptions are associated with the capability data sets, wherein each terms description defines the semantic meaning of terms used in a capability data set. The computing arrangement receives queries that indicate capability requirements of a data center. In response to a query, the capability data sets that match the query are provided to the requesting entity.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 3 is a block diagram of an example capability descriptor;

DETAILED DESCRIPTION

In various embodiments, an arrangement is provided for advertising capabilities of data centers to other data centers. The invention supports establishing a federated inter-data-center control system by way of capability advertisements and processing of resource inquiries. The capability advertisements specify resources that are available in the data centers, and the inquiries specify resources that are sought. The format by which the resources are described in an advertisement is described in a format definition, which is associated with the resources identified in the advertisement. This allows participating data centers to use a variety of formats to describe the resources without having to agree on a single format. Specific formats can evolve to meet changing requirements without requiring updates to the participating data centers.

Figure 1:
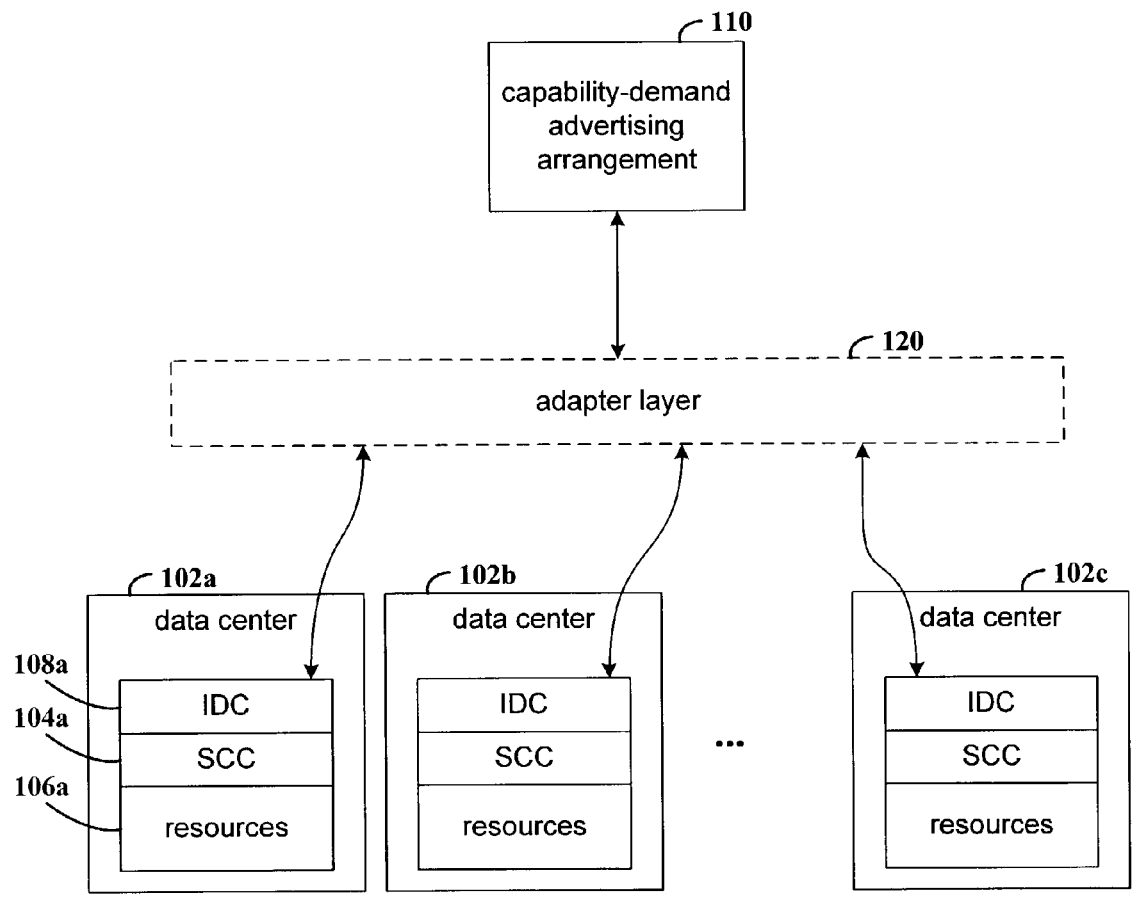
FIG. 1 is a functional block diagram of an example grid data center computing arrangement in accordance with one embodiment of the invention.

FIG. 1 is a functional block diagram of an example grid computing data center arrangement in accordance with one embodiment of the invention. The example arrangement includes multiple data centers 102a–102c. Each data center provides computing resources ranging from, for example, application-specific software services to hardware resources such as storage arrays. In an example embodiment, controller software in each data center provides tools for planning, designing, and managing resources of the data center. An example data center also includes a management hardware/software subsystem that determines and saves the information that describes the topology and resources in the data center. Example resources in the data center include servers, storage arrays, a network operations center/portal/integrated service subsystem, and various service applications.

Each data center includes a service core controller (SCC) that is responsible for managing the resources within the data center. For example, data center 102a includes SCC 104a, which manages the resources 106a. An inter-data-center controller (IDC) in each data center extends the functions of the SCC to include reallocating resources between data centers, rerouting and distributing load between data centers, and re-balancing service allocation arrangements between data centers in response to fluctuations in demand. IDC 108a is the inter-data-center controller for data center 102a. The IDCs are intercoupled via a network (not shown), for example.

The IDCs in each of the data centers are coupled to a capability-demand advertising arrangement 110. In an example embodiment, the advertising arrangement is responsible for registering descriptions of the capabilities ("capability descriptors") of the data centers as submitted by the IDC components. The capability descriptors are registered for a certain period of time ("lease period") to keep the advertised capabilities current relative to the actual capabilities at the data centers. In addition, if a data center is temporarily unavailable and the lease expires, the data center can submit a new capability descriptor when the data center is available, which allows the data center to rejoin the federation. The advertising arrangement also provides an interface that allows each data center to query the registered advertisments using a query descriptor (QD). In addition, each data center may withdraw an advertisement before the corresponding lease expires, or renew the lease for certain period of time.

In an example embodiment, the capability descriptors and query descriptors include format descriptions. The format description in a capability descriptor defines the syntax in which the advertised capabilities are set forth in the descriptor, and the format description in a query descriptor defines the syntax in which the query is set forth in the descriptor. The format descriptions allow a variety of formats to be used by the data centers, so long as the format descriptions are set forth in an agreed-upon manner.

In another embodiment, the capbility descriptors and query descriptors also include or refer to definitions of the terms used to describe the capabilities. This provides an added level of assurance that the capabilities advertised match the capabilities that are sought. Thus, a capability descriptor matches a query descriptor if the capabilities satisfy the query and the definitions of the capabilities in the capability descriptor and query descriptor are the same.

There are various infrastructures that are available to implement the capability-demand advertising arrangement. The infrastructure selected for a particular implementation will depend on design requirements. Example infrastructures include: well-known portals, bulletin boards or web sites that manage advertisements; universal description and discovery infrastructures comprised of a multitude of registry servers; enterprise directories, for example, X.500-based directories or LDAP directories; public or enterprise-wide search engines; and T-Spaces or Java-Spaces. With each infrastructure, the access point is known to each IDC.

In another embodiment, an adapter layer 120 translates advertising information to a capabilities descriptor of a format that is compatible with the advertising arrangement 110. The adapter layer hides specifics of the underlying implementation of the advertising arrangement from the IDC components and provides a generalized abstraction of how the capability descriptors and query descriptors can be described independent of the underlying implementation. This allows each data center to advertise and query for capabilities in a way that is independent of the manner used by the other data centers. Thus, the adapter layer eliminates the need for a priori agreements. The adapter layer is implemented at the level required by implementation requirements. For example, the adapter layer may be implemented at each data center within either the IDC or SCC components, or centrally within the topology.

Figure 2:
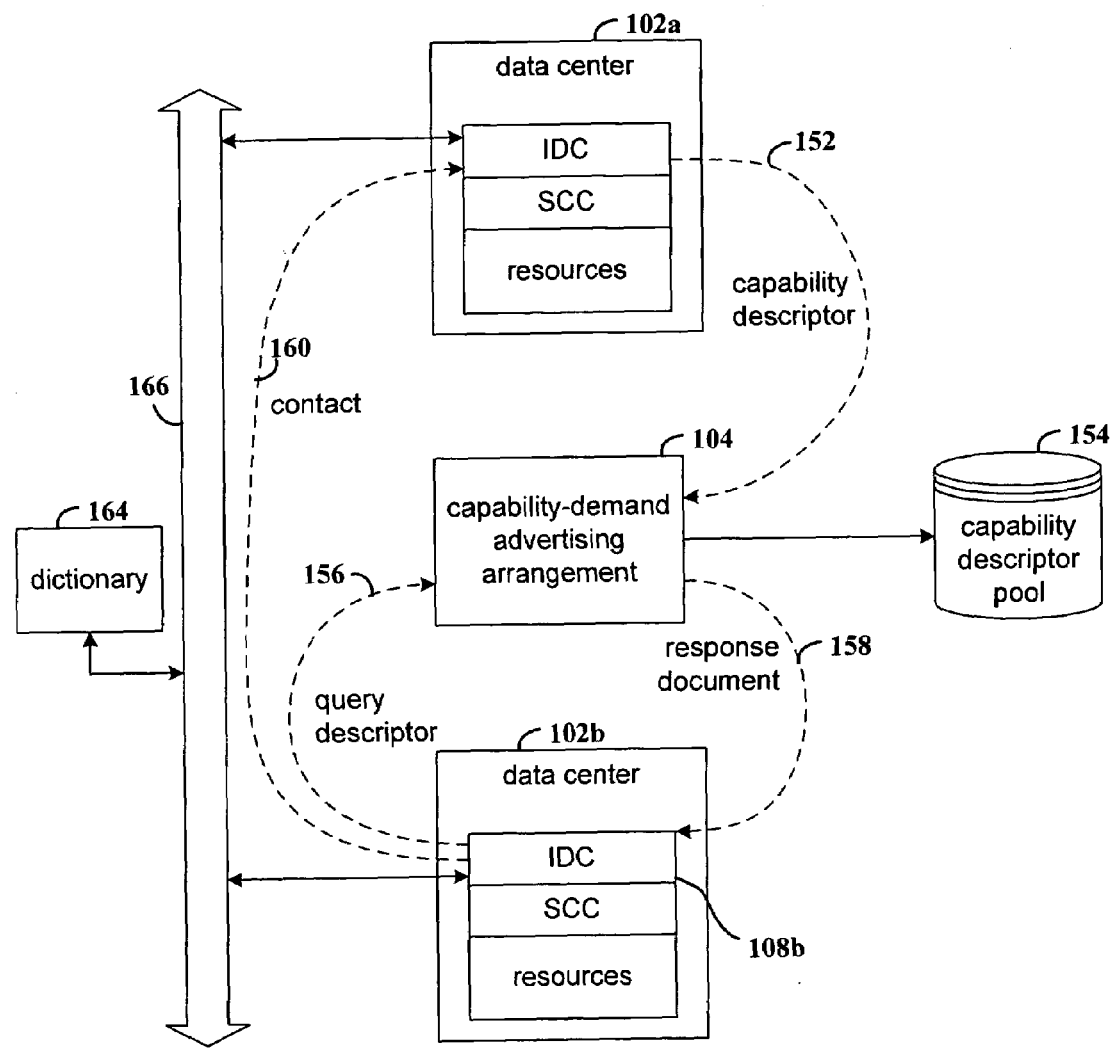
FIG. 2 illustrates an example data flow in advertising and querying the resource capabilities of a data center and establishing contact between an offering and inquiring data center.

FIG. 2 illustrates an example data flow in advertising the resource capabilities of a data center. The description of the data flow begins with the IDC of data center 102a transmitting a capability descriptor (line 152) to the capacity-demand advertising arrangement 104. The capability descriptor describes the capabilities offered by data center 102a, along with the previously described format description and definitions. Upon receiving a capability descriptor, the advertising arrangement adds the capability descriptor to a pool 154 of capability descriptors. Data center 102b submits a query descriptor (line 156) to the advertising arrangement when a need arises to determine whether any of the data centers participating with the advertising arrangement have a desired capability. In the example embodiment, the query descriptor includes a capability query (with capability terms and logical operators), a format description, and definitions associated with the terms. The advertising arrangement searches the pool of capability descriptors for those having attributes that match the attributes in the query descriptor and having definitions of terms that match the definitions of the terms in the query descriptor. A response document, containing the capability descriptors that satisfy the query, is returned (line 158) to the data center 102b that submitted the query. Data center 102b uses the information in the response document to identify a data center having the capabilities that best meets its resource needs. The IDC component 108b of data center 102b initiates contact (line 160) with the data center 102a that best meets the resource needs.

Because some terms in certain contexts may be ambiguous, a data center seeking certain capabilities would benefit from determining whether the capabilities offered by another data center are the same as those sought. Thus, definitions of selected terms are made accessible to each data center, by way of dictionary 164, which is accessible via network 166.

FIG. 3A is a block diagram of an example capability descriptor 202. The capability descriptor includes a format description 204, a capability identification 206, and definitions 208 of the terms in the capability identification. In an example embodiment, the format description, capability identification, and definitions are contained in a single XML document. In another embodiment, the format description, capability identification, and definitions could be associatively stored in a database, for example.

The format description 204 defines the syntax used in the capability identification 206. The format description needs to be understood by all participating data centers because it explains how the content of the capability identification is structured. For example, if XML is used in the capability identification, the XML Schema definition provides the syntax of the format used in the capability identification.

The capability description 206 contains the identification of capabilities advertised by a data center. Example capabilities include available resources or connection capacity. It is not required that all data centers know the format in advance because the format description provides the syntax for parsing and interpreting the capability identification.

The definitions 208 include (or alternatively, refer to) the meaning of the terms used in the capability identification 206. The definitions provide added assurance that the terms used by the advertising data center have the same meanings as terms used by a data center seeking capabilities. In an example embodiment, the terms used in the capability identification are declared in the definitions and associated with references to a shared dictionary where words and terms are explained in English. If the definition of a term in the capability descriptor references the same dictionary as the same term used in a query, then the terms have the same meaning.

FIG. 3B is a block diagram of an example query descriptor 252. The query descriptor includes a format description 254, a capability query 256, and definitions 258. The format description 254 defines the syntax of the capability query 256. Using the syntax defined in the format description, the capability-advertising arrangement reads the terms and operators from the capability query. The definitions are used to determine whether the terms in the query match the terms in a capability descriptor.

The following paragraphs describe an example implementation of a capability descriptor, a query descriptor, and a results document. A capability descriptor is a structured attribute-value list with mandatory attributes and optional attributes specified according to XML syntax. The attribute-value list is structured in that the values may be literal values or further attribute-value lists such that the overall structure forms a tree (recursive list of lists). The attributes include a name, an identifier, a data center location description, an access reference to the data center (for example, a URL), a lease period, and an access code (for example, a key to establish secure communication). Depending on the particular data center, additional attributes include descriptions of the capabilities of the data center such as the machines that are available for use, preconfigured software, operational policies, constraints and other characteristics.

The capability identification 206 describes data center capabilities such as available resource capacities or bandwidths of its network connections, installed machines, and software or service inventories offered to others. The following example code shows the capability descriptions from two capability descriptors, both advertising the same capabilities but using two different formats. Example 1 is the first capability description, and Example 2 is the second capability description. The elements that are advertised include: 1) the address of the IDC and the address of the SCC used to contact the associated data center; and 2) one set of lp2000r machines with a total of 48 CPUs and one n-class machine with 4 CPUs.

```
<?xml version="1.0"?>   <!--format A -->
<DC xmlns="x-schema:FormatASchema.xml">
    <IDC addr="cona.hpl.hp.com"/>
    <SCC addr="sos.hpl.hp.com"/>
    <capacities>
        <machine type="lp2000r" cpus="48" />
        <machine type="n-class" cpus="4" />
        <!-- . . . -->
    </capacities>
</DC>
```

EXAMPLE 1

```
<?xml version="1.0"?>   <!--format B -->
<DC xmlns="x-schema:FormatBSchema.xml">
    <accesspoints>
        <IDC>cona.hpl.hp.com</IDC>
        <SCC>sos.hpl.hp.com</to>
    </accesspoints>
    <description>
        <capacity>
            <machine>lp2000r</machine >
            <cpus>48</cpus>
        </ capacity >
        < capacity >
            < machine >n-class</machine >
            <cpus>4</cpus>
        </ capacity >
        <!-- . . . -->
    </description>
</DC>
```

EXAMPLE 2

The code in Examples 3 and 4 below illustrate the respective format descriptions associated with the capability identifications of Examples 1 and 2. XML is the example syntactical framework of the capability identifications, and the format descriptions contain XML schema defintions that describe the format. The xmins attribute in the capability description (Examples 1 and 2) specifies the location at which the format of the schema itself can be obtained by any interested party. The schema is used to parse the format specified by the schema.

```
<?xml version="1.0"?>
<xsd:Schema name="FormatASchema"
    xmlns:xsd="urn:schemas-microsoft-com:xml-data"
    xmlns:dt="urn:schemas-microsoft-com:datatypes>
<xsd:AttributeType name="type" dt:type="string"
                                required="yes"/>
<xsd:AttributeType name="cpus"
                            dt:type="dateTime"/>
<xsd:ElementType name="IDC" content="empty">
    <xsd:attribute type="addr"/>
</xsd:ElementType>
<xsd:ElementType name="SCC" content="empty">
    <xsd:attribute type="addr"/>
</xsd:ElementType>
<xsd:ElementType name="machine"
                    content="empty" order="seq">
    <xsd:attribute type="type"/>
    <xsd:attribute type="cpus"/>
</xsd:ElementType>
<xsd:ElementType name="capacities"
                                content="eltOnly">
<xsd:element type="machine" minOccurs="0"
                                maxOccurs="*"/>
</xsd:ElementType>
<xsd:ElementType name="DC"
                    content="eltOnly" order="seq">
    <xsd:element type="IDC"/>
    <xsd:element type="SCC"/>
    <xsd:element type="capacities"/>
</xsd:ElementType>
</xsd:Schema>
```

EXAMPLE 3

```
<?xml version="1.0"?>
<xsd:Schema name="FormatBSchema"
    xmlns:xsd="urn:schemas-microsoft-com:xml-data"
    xmlns:dt="urn:schemas-microsoft-com:datatypes">
<xsd:ElementType name="IDC" dt:type="string"
                                content="textOnly"/>
<xsd:ElementType name="SCC" dt:type="string"
                                content="textOnly"/>
<xsd:ElementType name="machine" dt:type="string" />
<xsd:ElementType name="cpus"
                                dt:type="dateTime"/>
<xsd:ElementType name="accesspoints"
                                content="eltOnly">
    <xsd:element type="IDC"/>
    <xsd:element type="SCC"/>
</xsd:ElementType>
<xsd:ElementType name="capacity" content="eltOnly"
                                          order="seq">
    <xsd:element type="machine"/>
    <xsd:element type="cpus" minOccurs="0"/>
</xsd:ElementType>
<xsd:ElementType name="description" content="eltOnly">
    <xsd:element type="capacity" minOccurs="0"
                                       maxOccurs="*"/>
</xsd:ElementType>
<xsd:ElementType name="DC"
                    content="eltOnly" order="seq">
<xsd:element type="accesspoints"/>
<xsd:element type="description"/>
</xsd:ElementType>
</xsd:Schema>
```

EXAMPLE 4

The definitions section provides the meanings of the terms used in the capability identification. Because some terms in certain contexts may be ambiguous, a data center seeking certain capabilities must determine whether the capabilities offered by another data center are the same as those sought. Thus, definitions of selected terms are made accessible to each data center. In the example embodiment, the definitions include the terms occurring in the format description and capability identification that having desired meanings. Associated with the terms are references to resources that provide the actual meanings of the terms. Example 5 below illustrates XML code that implements a set of definitions.

```
<?xml version="1.0"?>
<terms>
<entry term="machine"    dref="http://dcdict.com/entries#machine" />
<entry term="cpus"       dref="http://dcdict.com/entries#cpus" />
<entry term="type"       dref="http://dcdict.com/entries#type" />
<entry term="capacity"   dref="http://dcdict.com/entries#capacity" />
<entry term="description" dref="http://dcdict.com/entries#
                                description" />
<entry term="IDC"        dref="http://dcdict.com/entries#IDC" />
<entry term="SCC"        dref="http://dcdict.com/entries#SCC" />
    . . .
</terms>
```

EXAMPLE 5

In the example definitions, the agreed-to dictionary is reachable at http://udcdict.com. It will be appreciated, however, that multiple dictionaries may be referenced. Where multiple dictionaries are used, the actual definitions need to be maintained and compared. An example implementation of a dictionary is shown in the code of Example 6. Each term has an entry that can be referenced, along with an associated definition.

```
<?xml version="1.0"?>
<dictionary>
    <entry term="machine" />
        <explanation>
        Computing device that is capable of running software. A
        machine is characterized by a type and a number of processing
        elements named cpus. A machine . . .
        </explanation>
        <referenced term="type" />
        <referenced term="cpus" />
    <entry>
        . . .
    <entry term="type" />
        <explanation>
        In the context of a DC, a type refers to a kind of a machine that
        is characterized by a processor of a certain architecture . . .
        </explanation>
        <referenced term="machine" />
        <referenced term="cpus" />
        <referenced term="architecture" />
    <entry>
</dictionary>
```

EXAMPLE 6

The code of Examples 7, 8, and 9 illustrates the capability query, format description, and definitions sections of a an example query descriptor. A query descriptor contains a list of elements with attributes that may occur in a registered capability descriptor. The list may be related to required elements or attributes, or to optional attributes. The query descriptor in the example code represents a query that seeks a capability descriptor(s) that advertises 16 lpr2000 machines with a 100 GB storage block located in Palo Alto. Wildcard characters such as "*" and "?" as well as regular expressions can be used for matches. Alternatively, in another embodiment of the invention, XML standard techniques for extracting information from capability descriptor documents can be used to formulate queries.

```
<IQD>
    <location>*Palo*Alto*</location>     <!-- query attributes in
mandatory fields -->
    <!-- --------------------------- -->
    <server class="lpr2000" num="16"/> >  <!-- query attributes in
optional fields -->
    <storage class="*" capacity="100" />
</IQD>
Example 7
<?xml version="1.0"?>
<xsd:Schema name="FormatBSchema"
    xmlns:xsd="urn:schemas-microsoft-com:xml-data"
    xmlns:dt="urn:schemas-microsoft-com:datatypes">
<xsd:AttributeType name="class" dt:type="string" required="yes"/>
<xsd:AttributeType name="num" dt:type="string" required="yes"/>
<xsd:AttributeType name="capacity" dt:type="string" required="yes"/>
<xsd:ElementType name="storage" content="empty"/>
<xsd:attribute type="class" />
<xsd:attribute type="capacity" />
</xsd:ElementType>
<xsd:ElementType name="server" content="empty"/>
    <xsd:attribute type="class" />
    <xsd:attribute type="num" />
</xsd:ElementType>
<xsd:ElementType name="location" dt:type="string"
```

-continued

```
                                   content="textOnly"/>
<xsd:ElementType name="IQD"
                 content="eltOnly" order="seq">
    <xsd:element type="location"/>
    <xsd:element type="server"/>
    <xsd:element type="storage"/>
</xsd:ElementType>
</xsd:Schema>
```

EXAMPLE 8

```
<?xml version="1.0"?>
<terms>
    <entry term="location"  dref="http://dcdict.com/entries#location" />
    <entry term="server"    dref="http://dcdict.com/
                            entries#server" />
    <entry term="storage"   dref="http://dcdict.com/
                            entries#storage" />
    . . .
</terms>
```

EXAMPLE 9

The response document includes a list of capability descriptors having attributes that match the attributes specified in the query descriptor. The code below illustrates an example response document (RD).

```
<RD>
    <CD name="PaloAltoUDC"   <!-- first matching CD,      -->
        id="PACAUS">             e.g. the one from
        . . .                <!-- FIG. 3                  -->
    </CD>
    <CD . . . > . . .        <!-- second matching CD -->
    </CD>
    . . .
</RD>
```

Figure 4:
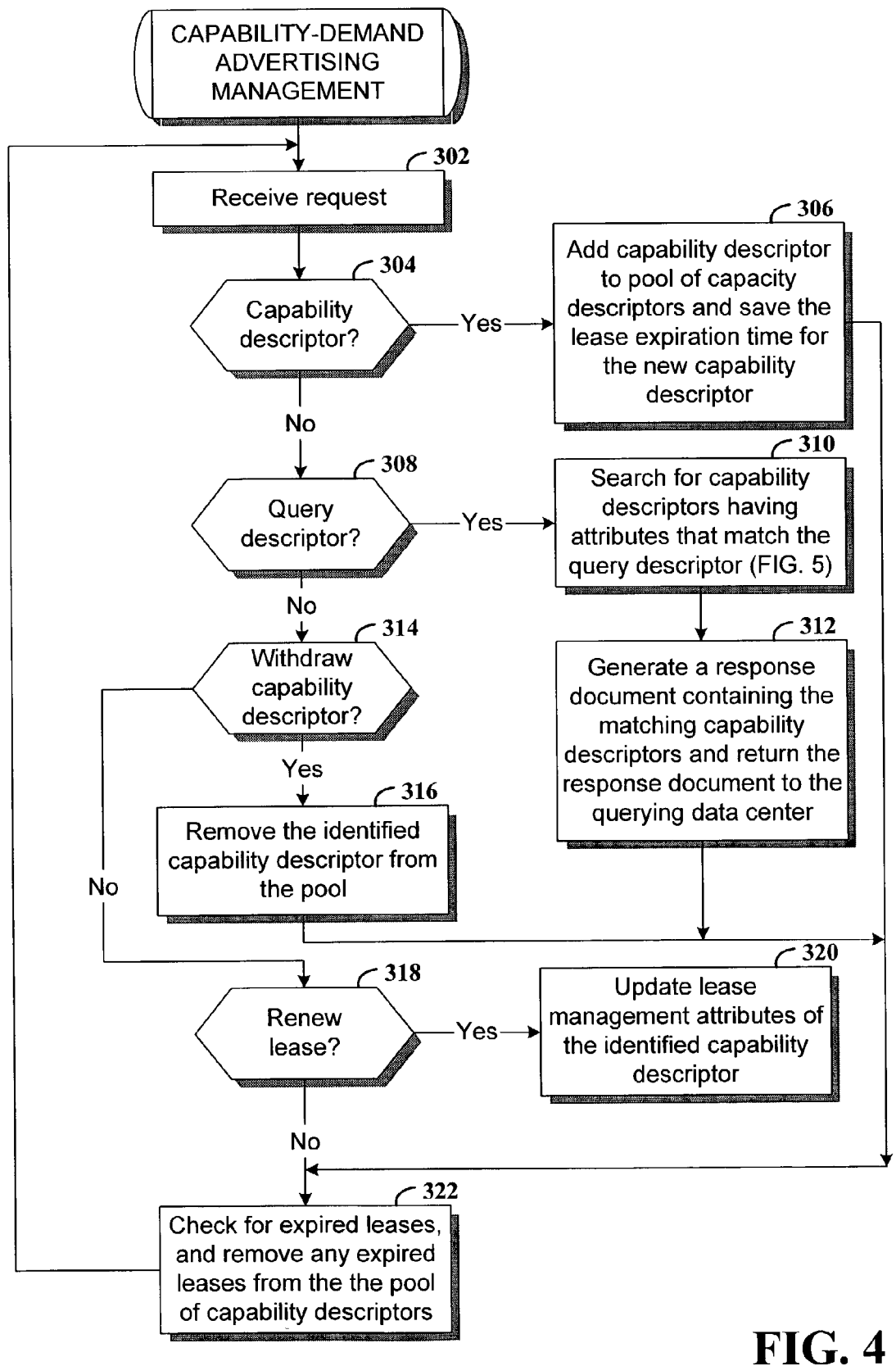
FIG. 4 is a flowchart of an example process for managing capability advertising in accordance with an example embodiment of the invention.

FIG. 4 is a flowchart of an example process for managing capability advertising in accordance with an example embodiment of the invention. When the advertising arrangement receives a request from a data center (step 302), the type of request dictates the action taken. If the request is a capability descriptor (decision step 304), the capability descriptor is added to the registry of capability descriptors, and a timestamp ("lease expiration time") is saved in association with the capability descriptor (step 306).

If the request is a query descriptor (decision step 308), the registry of capacity descriptors is searched for capacity descriptors having attributes that match the attributes in the query descriptor (step 310). A response document with the matching capacity descriptors is generated and returned to the inter-data-center controller that submitted the query (step 312).

If the request is for withdrawal of a capability descriptor (decision step 314), the identified capability descriptor is removed from the registry (step 316). If the request is to renew (or extend) a lease for a capability descriptor (decision step 318), the lease-management attributes, for example, the lease expiration time, of the capability descriptor are updated (step 320).

Periodically, the advertising arrangement checks for capability descriptors having expired leases (step 322). When the lease expires, the capability descriptor is removed from the registry. It will be appreciated that even though the example process shows that leases are checked after processing each request, the check could alternatively be part of a separate process or performed before each request is processed.

Figure 5:
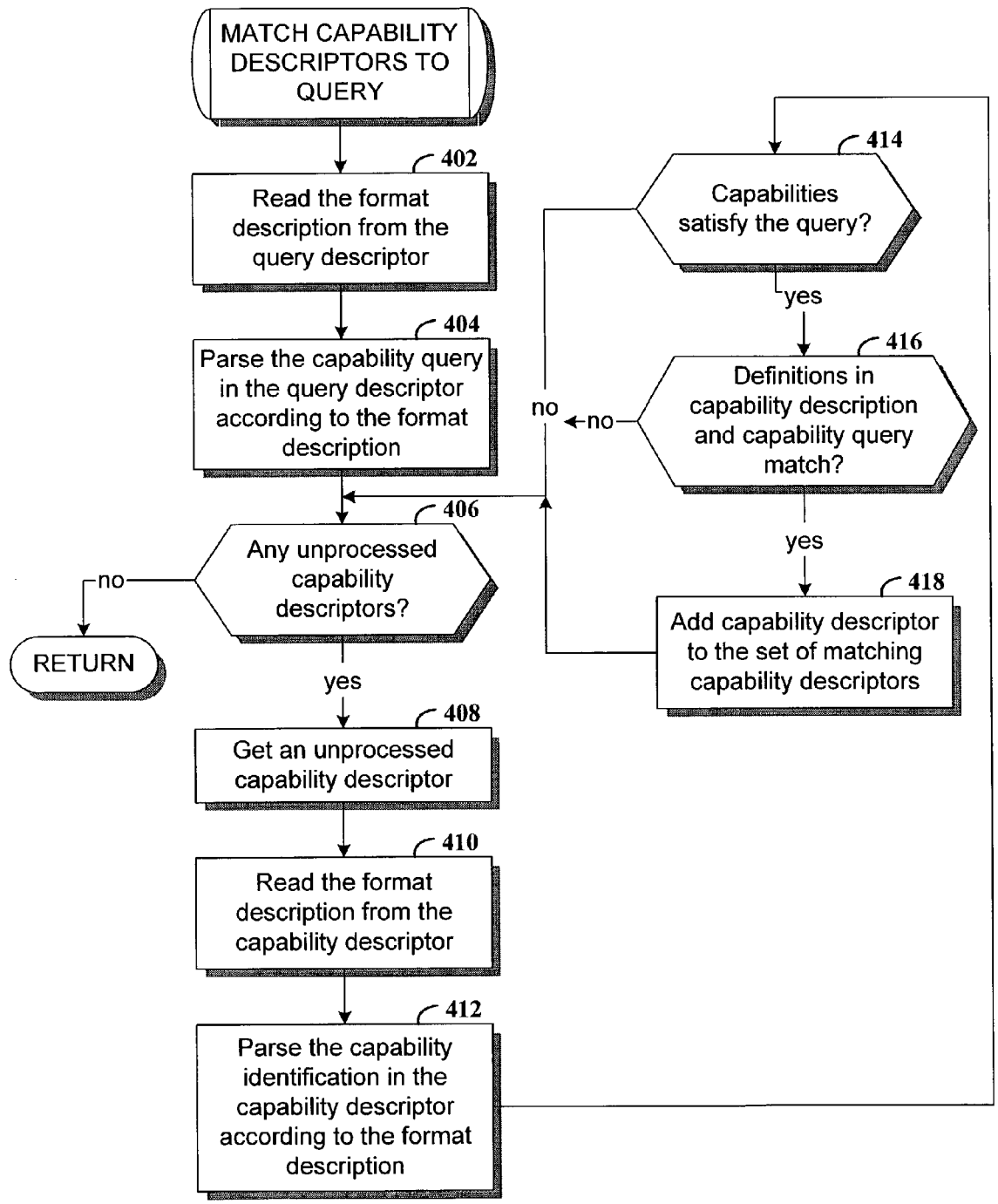
FIG. 5 is a flowchart of an example process for matching capability descriptors to a query in accordance with another embodiment of the invention.

FIG. 5 is a flowchart of an example process for matching capability descriptors to a query in accordance with another embodiment of the invention. The process first obtains the capability query from the query descriptor. In order to do so, the format description is read from the query descriptor (step 402). Using the syntax defined in the format description, the capability query is parsed to obtain the query, which includes some combination of terms and operators (step 404).

Once the query is obtained, the process determines which of the capability descriptors satisfy the query. As long as there are capability descriptors that have not been checked (decision step 406), an unprocessed capability descriptor is obtained (step 408) and checked. To determine whether the capabilities of the capability descriptor satisfy the query, the process reads the format description of the capability descriptor (step 410). Using the format description, the specific capabilities offered in the capability descriptor are obtained by parsing the capability identification (step 412). If the capabilities satisfy the query (decision step 414), and the definitions of the terms as referenced in the query descriptor and capability descriptor match (decision step 416), then the capability descriptor is added to a set of matching capability descriptors (step 418). If either the capabilities do not satisfy the query or the definitions do not match, the process continues with another unprocessed capability descriptor (step 406).

The present invention is believed to be applicable to a variety of systems for exchanging information describing the capabilities of data centers and has been found to be particularly applicable and beneficial in grid computing arrangements. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method of advertising capabilities of data centers, comprising:

storing at a computing arrangement respective capability data sets for one or more of a plurality of data centers, wherein each capability data set includes terms that specify resources available at a data center;

associating respective format descriptions with the capability data sets, wherein each format description defines a syntax in which capabilities are described in a capability data set;

associating with the terms in the capability data sets, respective references to definitions in a first network accessible dictionary;

receiving queries from requesting data centers at the computing arrangement, each query including at least one term that specifies a resource and for each term a respective reference to a definition of the term in a second network accessible dictionary;

parsing the capability data sets according to the associated format descriptions, and determining which of the capability data sets has terms that satisfy each query;

in response to each capability data set that has terms that satisfy the query, for each term in the query and a corresponding term from the capability data set that satisfies the term of the query, comparing the respectively referenced definition in the second dictionary to the respectively referenced definition in the first dictionary; and providing to a requesting data center, in response to each query from the requesting data center, each capability data set that satisfies the query and that has for each term from the capability data set that satisfies a term of the query, a definition from the first dictionary that matches a definition from the second dictionary of the term in the query.

2. The method of claim 1, wherein each query includes one or more logic operators, the method further comprising:

associating respective query-format descriptions with the queries, wherein each query-format description defines a syntax in which capability requirements are described in the query;

obtaining resource terms from the capability data sets using format descriptions associated with the capability data sets;

obtaining resource terms and logic operators from the queries using query-format descriptions associated with the queries; and determining whether for each capability data set the one or more resource terms in the data set satisfy the one or more resource terms and one or more logic operators in each query.

3. The method of claim 1, wherein each capability data set includes a data center identifier.

4. The method of claim 1, wherein each capability data set includes data that indicate addressing information of the data center associated with the capability data set.

5. The method of claim 1, wherein each capability data set includes data that describe at least one of one or more types of servers, one or more types of storage, one or more quantities of storage, and one or more service descriptions.

6. The method of claim 5, wherein each query includes data that describe at least one of the one or more types of servers, the one or more types of storage, a quantity of storage, and the one or more service descriptions.

7. A computer-implemented method of advertising capabilities of data centers, comprising:

storing at a computing arrangement respective capability data sets for one or more of a plurality of data centers, wherein each capability data set includes terms that specify resources available at a data center;

associating with the terms in the capability data sets, respective references to definitions in a first network accessible dictionary;

maintaining storage for each capability data set in the computing arrangement for up to a selected maximum period of time that defines a lease period;

associating respective format descriptions with the capability data sets, wherein each format description defines a syntax in which capabilities are described in a capability data set;

receiving queries from requesting data centers at the computing arrangement, each query including at least one term that specifies a resource and for each term a respective reference to a definition of the term in a second network accessible dictionary;

parsing the capability data sets according to the associated format descriptions, and determining which of the capability data sets has terms that satisfy each query;

in response to each capability data set that has terms that satisfy the query, for each term in the query and a corresponding term from the capability data set that satisfies the term of the query, comparing the respectively referenced definition in the second dictionary to the respectively referenced definition in the first dictionary; and providing to a requesting data center, in response to each query from the requesting data center, each capability data set that satisfies the query and that has for each term from the capability data set that satisfies a term of the query, a definition from the first dictionary that matches a definition from the second dictionary of the term in the query.

8. The method of claim 7, wherein each query includes one or more resource terms describing capability requirements and one or more logic operators, the method further comprising:

associating respective query-format descriptions with the queries, wherein each query-format description defines a syntax in which capability requirements are described in the query;

obtaining resource terms from the capability data sets using format descriptions associated with the capability data sets;

obtaining resource terms and logic operators from the queries using query-format descriptions associated with the queries; and determining whether for each capability data set the one or more resource terms in the data set satisfy the one or more resource terms and one or more logic operators in each query.

9. The method of claim 8, further comprising withdrawing registration of a capability data set before expiration of an associated lease period in response to a request from the data center associated with the capability data set.

10. The method of claim 8, further comprising extending the lease period of a capability data set in response to a request from the data center associated with the capability data set.

11. The method of claim 8, wherein each capability data set includes a data center identifier.

12. The method of claim 8, wherein each capability data set includes data that indicate addressing information of the data center associated with the capability data set.

13. The method of claim 8, wherein each capability data set includes data that describe at least one of one or more types of servers, one or more types of storage, one or more quantities of storage, and one or more service descriptions.

14. The method of claim 13, wherein each query includes data that describe at least one of the one or more types of servers, the one or more types of storage, a quantity of storage, and the one or more service descriptions.

15. An apparatus for advertising capabilities of data centers, comprising:

means for storing at a computing arrangement respective capability data sets for one or more of a plurality of data centers, wherein each capability data set includes terms that specify resources available at a data center;

means for associating respective format descriptions with the capability data sets, wherein each format description defines a syntax in which capabilities are described in a capability data set;

means for associating with the terms in the capability data sets, respective references to definitions in a first network accessible dictionary;

means for receiving queries from requesting data centers at the computing arrangement, each query including at least one term that specifies a resource and for each term a respective reference to a definition of the term in a second network accessible dictionary;

means for associating definitions with resource terms in each query;

means for parsing the capability data sets according to the associated format descriptions, and for determining which of the capability data sets has terms that satisfy each query;

means, responsive to each capability data set that has terms that satisfy the query, for comparing, for each term in the query and a corresponding term from the capability data set that satisfies the term of the query, the respectively referenced definition in the second dictionary to the respectively referenced definition in the first dictionary; and means for providing to a requesting data center, in response to each query from the requesting data center, each capability data set that satisfies the query and that has for each term from the capability data set that satisfies a term of the query, a definition of the term in the query.

16. The apparatus of claim 15, further comprising means for maintaining storage for each capability data set in the computing arrangement for up to a selected maximum period of time that defines a lease period.

17. An article of manufacture, comprising:

a computer readable medium configured with instructions for causing a computer to perform the steps of, storing at a computing arrangement respective capability data sets for one or more of a plurality of data centers, wherein each capability data set includes terms that specify resources available at a data center;

associating respective format descriptions with the capability data sets, wherein each format description defines a syntax in which capabilities are described in a capability data set;

associating with the terms in the capability data sets, respective references to definitions in a first network accessible dictionary;

receiving queries from requesting data centers at the computing arrangement, each query including at least one term that specifies a resource and for each term a respective reference to a definition of the term in a second network accessible dictionary;

parsing the capability data sets according to the associated format descriptions, and determining which of the capability data sets has terms that satisfy each query;

in response to each capability data set that has terms that satisfy the query, for each term in the query and a corresponding term from the capability data set that satisfies the term of the query, comparing the respectively referenced definition in the second dictionary to the respectively referenced definition in the first dictionary; and providing to a requesting data center, in response to each query from the requesting data center, each capability data set that satisfies the query and that has for each term from the capability data set that satisfies a term of the query, a definition of the term in the query.

18. The article of claim 17, wherein the computer readable medium is further configured with instructions for causing a computer to perform the step of maintaining storage for each capability data set in the computing arrangement for up to a selected maximum period of time that defines a lease period.

* * * * *

UNITED STATES PATENT AND TRADEMARK OFFICE
CERTIFICATE OF CORRECTION

PATENT NO. : 7,200,589 B1
APPLICATION NO. : 10/264587
DATED : April 3, 2007
INVENTOR(S) : Sven Graupner It is certified that error appears in the above-identified patent and that said Letters Patent is hereby corrected as shown below:

On page 2, item (56), under "Other Publications", in column 2 , lines 9-12, delete "Rolia, J., Singhal, S., Friedrich, R.: Adaptive Date Centers, Proceedings of SSGRR 2000 Computer and eBusiness Conference, L'Aquila, Italy, Proceedings on CD-ROM, ISBN 88-85280-52-8, Aug. 2000.".

In column 6, line 33, delete "xmins" and insert -- xmlns --, therefor.

Signed and Sealed this

Fifth Day of May, 2009

JOHN DOLL
*Acting Director of the United States Patent and Trademark Office*